US012392885B2

(12) United States Patent
Ali et al.

(10) Patent No.: US 12,392,885 B2
(45) Date of Patent: Aug. 19, 2025

(54) MULTI-STATIC RADAR DETECTION SYSTEM FOR A VEHICLE

(71) Applicants: GM Global Technology Operations LLC, Detroit, MI (US); University of Southern California, Los Angeles, CA (US)

(72) Inventors: Kamran Ali, Troy, MI (US); Fan Bai, Ann Arbor, MI (US); Andreas Molisch, Los Angeles, CA (US); Nikhil Kowshika Nataraja, Los Angeles, CA (US); Sudhanshu Sharma, Los Angeles, CA (US)

(73) Assignees: GM GLOBAL TECHNOLOGY OPERATIONS LLC, Detroit, MI (US); UNIVERSITY OF SOUTHERN CALIFORNIA, Los Angeles, CA (US)

( * ) Notice: Subject to any disclaimer, the term of this patent is extended or adjusted under 35 U.S.C. 154(b) by 448 days.

(21) Appl. No.: 18/048,551

(22) Filed: Oct. 21, 2022

(65) Prior Publication Data
US 2024/0134032 A1 Apr. 25, 2024
US 2024/0230879 A9 Jul. 11, 2024

(51) Int. Cl.
*G01S 13/58* (2006.01)
*G01S 13/50* (2006.01)

(52) U.S. Cl.
CPC .......... *G01S 13/582* (2013.01); *G01S 13/505* (2013.01)

(58) Field of Classification Search
CPC . H04B 7/0413; B60R 21/0134; G01S 13/931; G01S 13/584; G01S 13/582;
(Continued)

(56) References Cited

U.S. PATENT DOCUMENTS 10,063,295 B2 * 8/2018 Delfeld ............... H04L 25/4975
2018/0074192 A1 * 3/2018 Rector .................... G01S 7/003
(Continued)

FOREIGN PATENT DOCUMENTS

DE    3639500 C2 *  4/1989  ......... G01S 13/5242

OTHER PUBLICATIONS

A. Evers and J. A. Jackson, "Analysis of an LTE waveform for radar applications," in 2014 IEEE Radar Conference. IEEE, May 19, 2014, pp. 0200-0205.
(Continued)

*Primary Examiner* — Vladimir Magloire
*Assistant Examiner* — Peter Davon Doze
(74) *Attorney, Agent, or Firm* — Vivacqua Crane, PLLC

(57) ABSTRACT

A multi-static radar detection system for a vehicle includes one or more receivers for collecting multi-carrier modulation signals emitted by one or more transmitters that are positioned at base stations located in an environment surrounding the vehicle. The multi-carrier modulation signals include one or more types of reference signals. The multi-static radar detection system also includes one or more controllers in electronic communication with the one or more receivers. The one or more controllers execute instructions to collect, by the one or more receivers, a multi-carrier modulation signal emitted by the one or more transmitters. The one or more controllers determine a Doppler shift and a time delay of a respective object located within the environment surrounding the vehicle based on an interpolated time-frequency grid; and transform a value for the Doppler shift into a velocity value and a value for the time delay into a range value.

18 Claims, 4 Drawing Sheets

(58) Field of Classification Search
CPC .......... G01S 13/505; G01S 7/354; G01S 7/40; G01S 13/878; G01S 7/0232; G01S 7/0235

See application file for complete search history.

(56) References Cited

U.S. PATENT DOCUMENTS

| | | | | |
|---|---|---|---|---|
| 2018/0348340 | A1* | 12/2018 | Lien | G01S 7/2813 |
| 2022/0171016 | A1* | 6/2022 | Manolakos | H04L 41/0803 |
| 2022/0260697 | A1* | 8/2022 | Saitto | G01S 13/003 |
| 2023/0299862 | A1* | 9/2023 | O'Shea | G06N 3/045 |
| | | | | 370/252 |

OTHER PUBLICATIONS

C. B. Barneto, L. Anttila, M. Fleischer, and M. Valkama, "Ofdm radar with lte waveform: Processing and performance," in 2019 IEEE Radio and Wireless Symposium (RWS). IEEE, Jan. 2019, pp. 1-4.

C. B. Barneto, T. Riihonen, M. Turunen, L. Anttila, M. Fleischer, K. Stadius, J. Riihonen, and M. Valkama, "Full-duplex pfdm radar with lte and 5g nr waveforms: Challenges, solutions, and measurements," IEEE Transactions on Microwave Theory and Techniques, vol. 67, No. 10, pp. 4042-4054, Aug. 9, 2019.

C. Sturm, M. Braun, T. Zwick, and W. Wiesbeck, "A multiple target doppler estimation algorithm for ofdm based intelligent radar systems," in the 7th European Radar Conference. IEEE, Oct. 1, 2010, pp. 73-76.

C. Sturm, T. Zwick, and W. Wiesbeck, "An ofdm system concept for joint radar and communications operations," in VTC Spring 2009—IEEE 69th Vehicular Technology Conference. IEEE, Apr. 26, 2009, pp. 1-5.

D. G. Long and R. O. Franz, "Band-limited signal reconstruction from irregular samples with variable apertures," IEEE Transactions on Geoscience and Remote Sensing, vol. 54, No. 4, pp. 2424-2436, Apr. 2016.

E. Dahlman, S. Parkvall, and J. Skold, 5G NR: The next generation wireless access technology. Academic Press, Aug. 9, 2018.

M. Braun, C. Sturm, and F. K. Jondral, "Maximum likelihood speed and distance estimation for ofdm radar," in 2010 IEEE Radar Conference. IEEE, May 10, 2010, pp. 256-261.

Y. Dan, X. Wan, J. Yi, and Y. Rao, "Ambiguity function analysis of long term evolution transmission for passive radar," in 2018 12th International Symposium on Antennas, Propagation and EM Theory (ISAPE). IEEE, 2018, pp. 1-4.

R. Wang, O. Renaudin, C. U. Bas, S. Sangodoyin, and A. F. Molisch, "On channel sounding with switched arrays in fast time-varying channels," IEEE Transactions on Wireless Communications, vol. 18, No. 8, pp. 3843-3855, May 18, 2018.

W. Li, B. Tan, and R. Piechocki, "Passive radar for opportunistic monitoring in e-health applications," IEEE journal of translational engineering in health and medicine, vol. 6, pp. 1-10, Jan. 25, 2018.

W. Li, M. J. Bocus, C. Tang, R. J. Piechocki, K. Woodbridge, and K. Chetty, "On csi and passive wi-fi radar for opportunistic physical activity recognition," IEEE Transactions on Wireless Communications, vol. 21, No. 1, pp. 607-620, Jul. 27, 2021.

* cited by examiner

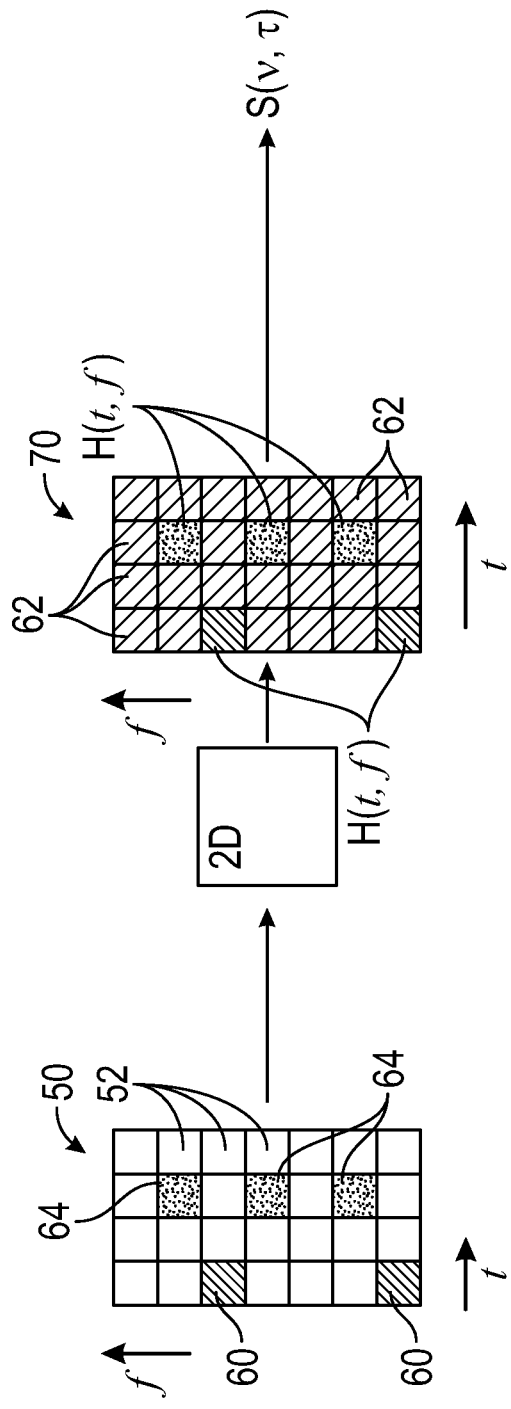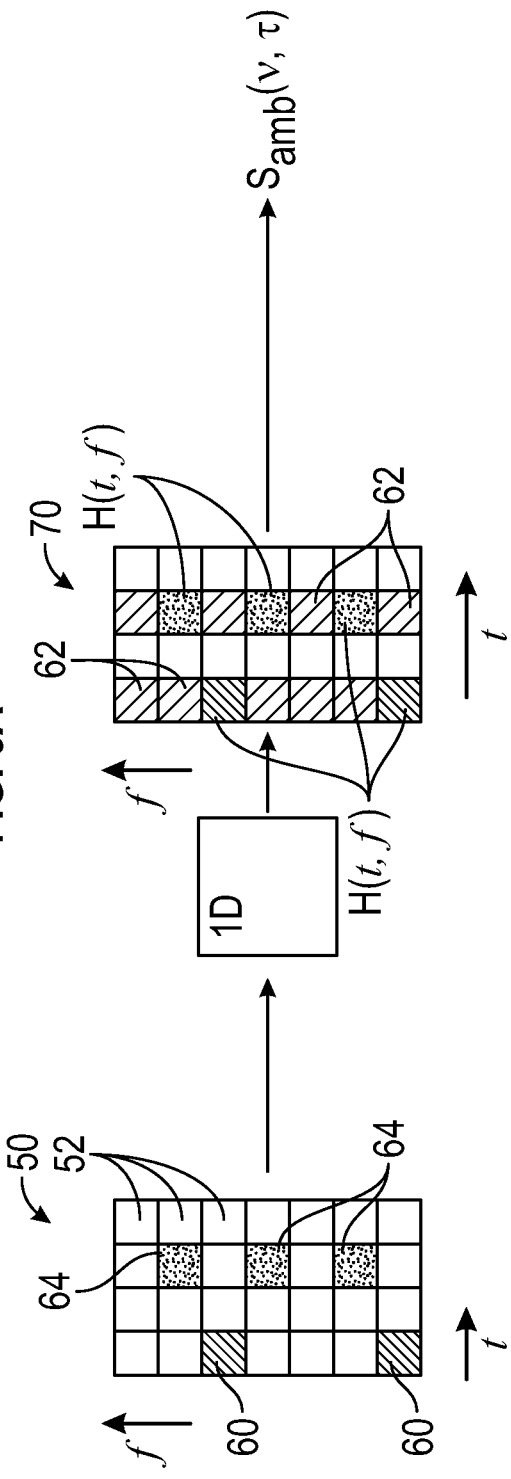

MULTI-STATIC RADAR DETECTION SYSTEM FOR A VEHICLE

INTRODUCTION

The present disclosure relates to a multi-static radar detection system for a vehicle that estimates a Doppler shift and a time delay of objects located in an environment surrounding the vehicle based on multi-carrier modulation signals that comply with a wireless communication standard.

Many vehicles employ radar sensors for scanning the surrounding environment to detect objects and determine a speed and disposition of the detected objects. Radar architectures may be classified as monostatic, bistatic, or multi-static configurations. Radars with a monostatic configuration include a transmitter and receiver that are positioned in the same location, while radars with a bistatic configuration include a transmitter and receiver that are separated by a distance. The multi-static radar system includes multiple spatially diverse monostatic radar or bistatic radar components having a shared coverage area.

A vehicle typically employs monostatic radars for object detection, where the monostatic radar is often mounted to areas such as a front bumper or the roof of the vehicle's exterior. Because of their singular location and placement on the vehicle, monostatic radars tend to have a limited range and field-of-view. As a result of the limited range and field-of-view, it may be challenging for the vehicle's radar system to detect objects in some driving situations. For example, when the vehicle is traveling along an on-ramp and is about to merge onto a main road or a highway, the position of the vehicle on the on-ramp and the monostatic radar's limited field-of-view makes it difficult for the monostatic radar to detect the vehicles driving along the main road.

Thus, while current radar systems achieve their intended purpose, there is a need in the art for a radar system with improved object detection capabilities.

SUMMARY

According to several aspects, a multi-static radar detection system for a vehicle is disclosed. The multi-static radar detection system includes one or more receivers for collecting multi-carrier modulation signals emitted by one or more transmitters that are positioned at base stations located in an environment surrounding the vehicle. The multi-carrier modulation signals include one or more types of reference signals. The multi-static radar detection system also includes one or more controllers in electronic communication with the one or more receivers. The one or more controllers execute instructions to collect, by the one or more receivers, a multi-carrier modulation signal emitted by the one or more transmitters, where a time-frequency grid representing the multi-carrier modulation signal is divided into a plurality of resource elements. The one or more controllers calculate a time-varying frequency response for each resource element that is part of the time-frequency grid that contains a corresponding reference signal based on a time-frequency analysis. The one or more controllers perform non-uniform interpolation on at least a portion of unoccupied resource elements that are part of the time-frequency grid to determine a corresponding transfer function, where an interpolated time-frequency grid includes the time-varying frequency response and the corresponding transfer function for the unoccupied resource elements. The one or more controllers determine a Doppler shift and a time delay of a respective object located within the environment surrounding the vehicle based on the interpolated time-frequency grid. Finally, the one or more controllers transform a value for the Doppler shift into a velocity value and a value for the time delay into a range value.

In an aspect, the one or more controllers determine a channel response function that includes the Doppler shift and the time delay of the respective object.

In another aspect, performing non-uniform interpolation on at least the portion of unoccupied resource elements that are part of the time-frequency grid includes performing two-dimensional non-uniform interpolation for each unoccupied resource element of the time-frequency grid to determine the corresponding transfer function for each unoccupied resource element that is part of the time-frequency grid.

In still another aspect, the one or more controllers execute instructions to convert the time-varying frequency response and the corresponding transfer function for each resource element that is part of the interpolated time-frequency grid into corresponding Doppler spreading function values. The one or more controllers compare an absolute squared value of each of the corresponding Doppler spreading function values with a threshold power value for each resource element of the interpolated time-frequency grid.

In an aspect, in response to determining the absolute squared value for a Doppler spreading function values shift corresponding to a specific resource element in the interpolated time-frequency grid is equal to or greater than the threshold power value, the one or more controllers transform the value for the Doppler shift into a velocity value and transform the value for the time delay into a range value.

In another aspect, the threshold power value is indicative of the multi-carrier modulation signals reflecting off the respective object located in the environment surrounding the vehicle.

In still another aspect, performing non-uniform interpolation on at least the portion of unoccupied resource elements that are part of the time-frequency grid comprises performing one-dimensional non-uniform interpolation only for unoccupied resource elements located at the same time interval as a reference signal to determine the corresponding transfer function for the unoccupied resource elements that are part of the time-frequency grid.

In an aspect, the one or more controllers execute instructions to cross-correlate the time-varying frequency response for each resource element containing the corresponding reference signal and the corresponding transfer function for the unoccupied resource elements of the interpolated time-frequency grid with a corresponding Doppler shift and a corresponding time delay of to determine a correlation sum. The one or more controllers fill a two-dimensional ambiguity grid with the correlation sum determined for each grid element of the two-dimensional ambiguity grid.

In another aspect, the one or more controllers execute instructions to select a maximum correlation sum from the two-dimensional ambiguity grid, where the maximum correlation sum includes a peak value for the Doppler shift and a peak value for the time delay. The one or more controllers determine a reconstructed time-varying frequency response based on the peak value of the Doppler shift and the peak value of the time delay for each grid element corresponding to a reference signal of the interpolated time-frequency grid. The one or more controllers determine a difference between the reconstructed time-varying frequency response and the time-varying frequency response for a specific resource element of the interpolated time-frequency grid. The one or more controllers compare the difference with a threshold power value.

In an aspect, in response to determining the difference between the reconstructed time-varying frequency response and the time-varying frequency responses is greater than the threshold power value, the one or more controllers update the corresponding resource element of the interpolated time-frequency grid with the difference. The one or more controllers repeat selecting the maximum correlation sum from the two-dimensional ambiguity grid until the difference between the reconstructed time-varying frequency response and the time-varying frequency responses is less than the threshold power value.

In another aspect, the multi-carrier modulation signals include two or more types of reference signals.

In yet another aspect, the two or more types of reference signals include channel state information reference signals (CSI-RS), positioning reference signals (P-RS), and demodulation reference signals (DM-RS).

In an aspect, the multi-carrier modulation signals are compliant with a wireless data standard.

In another aspect, a receiver increases an active bandwidth part (BWP) by requesting dummy data having an elevated urgency from one of the base stations.

In still another aspect, the time-varying frequency response is used as basis for interpolation for any resource element of the time-frequency grid for which the one or more receivers have knowledge of the multi-carrier modulation signal transmitted by one or more transmitters.

In an aspect, a vehicle is disclosed, and includes a multi-static radar detection system. The multi-static radar detection system includes one or more receivers for collecting multi-carrier modulation signals emitted by one or more transmitters that are positioned at base stations located in an environment surrounding the vehicle. The multi-carrier modulation signals include one or more types of reference signals. The multi-static radar detection system also includes one or more controllers in electronic communication with the one or more receivers. The one or more controllers execute instructions to collect, by the one or more receivers, a multi-carrier modulation signal emitted by the one or more transmitters, where a time-frequency grid representing the multi-carrier modulation signal is divided into a plurality of resource elements. The one or more controllers calculate a time-varying frequency response for each resource element that is part of the time-frequency grid that contains a corresponding reference signal based on a time-frequency analysis. The one or more controllers perform non-uniform interpolation on at least a portion of unoccupied resource elements that are part of the time-frequency grid to determine a corresponding transfer function, where an interpolated time-frequency grid includes the time-varying frequency response and the corresponding transfer function for the unoccupied resource elements. The one or more controllers determine a Doppler shift and a time delay of a respective object located within the environment surrounding the vehicle based on the interpolated time-frequency grid. Finally, the one or more controllers transform a value for the Doppler shift into a velocity value and a value for the time delay into a range value.

In another aspect, the one or more controllers determine a channel response function that includes the Doppler shift and the time delay of the respective object.

In still another aspect, the multi-carrier modulation signal includes two or more types of reference signals.

In an aspect, the multi-carrier modulation signal is compliant with a wireless data standard.

In an aspect, a method for estimating a Doppler shift and a time delay of one or more objects located in an environment surrounding a vehicle by a multi-static radar detection system is disclosed. The method includes collecting, by one or more receivers, a multi-carrier modulation signal emitted by one or more transmitters, wherein a time-frequency grid representing the multi-carrier modulation signal is divided into a plurality of resource elements, where the one or more receivers are positioned at base stations located in the environment surrounding the vehicle, and the multi-carrier modulation signals include one or more types of reference signals. The method includes calculating a time-varying frequency response for each resource element that is part of the time-frequency grid that contains a corresponding reference signal based on a time-frequency analysis. The method includes performing non-uniform interpolation on at least a portion of unoccupied resource elements that are part of the time-frequency grid to determine a corresponding transfer function, where an interpolated time-frequency grid includes the time-varying frequency response and the corresponding transfer function for the unoccupied resource elements. The method includes determining a channel response function based on the interpolated time-frequency grid, wherein the channel response function describes a Doppler shift and a time delay of a respective object located within the environment surrounding the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3A illustrates a portion of an exemplary time-frequency grid of the multi-carrier modulation signal where two-dimensional non-uniform interpolation is employed, according to an exemplary embodiment;

FIG. 3B illustrates a portion of an exemplary time-frequency grid of the multi-carrier modulation signal based where one-dimensional non-uniform interpolation is employed, according to an exemplary embodiment;

DETAILED DESCRIPTION

The following description is merely exemplary in nature and is not intended to limit the present disclosure, application, or uses.

Figure 1:
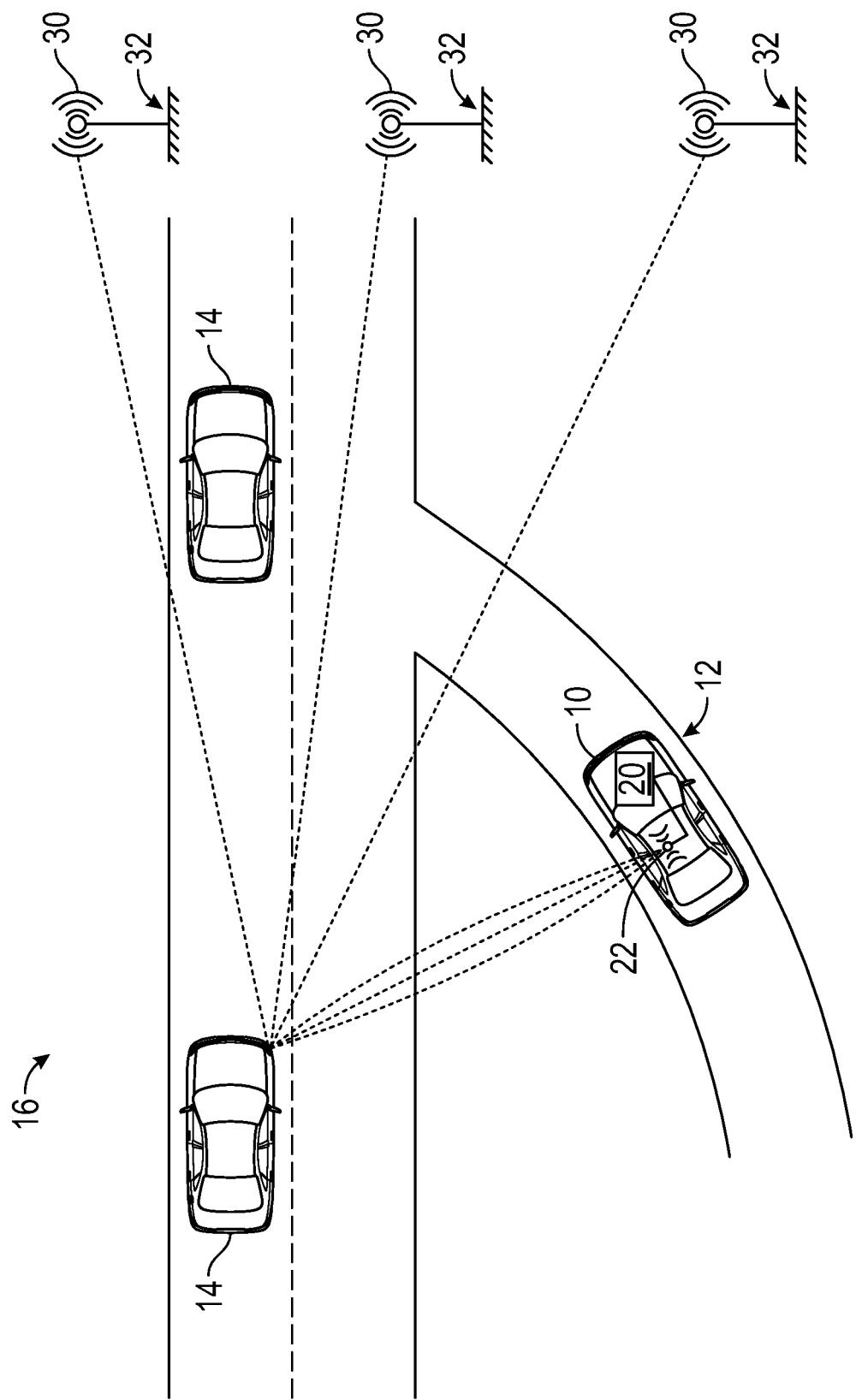
FIG. 1 is a schematic diagram of the disclosed multi-static radar detection system including transmitters located at base stations and a vehicle including one or more receivers for collecting the signals emitted by the transmitters, according to an exemplary embodiment.

Referring to FIG. 1, an exemplary multi-static radar detection system 12 for a vehicle 10 is illustrated. As explained below, the disclosed multi-static radar detection system 12 estimates a Doppler shift and a time delay of one or more objects 14 located in an environment 16 surrounding the vehicle 10. The vehicle 10 may be any type of vehicle such as, but not limited to, a sedan, truck, sport utility vehicle, van, or motor home. In the example as shown in FIG. 1, the objects 14 are other vehicles. However, it is to be appreciated that the objects 14 are not limited to vehicles and may be other items as well such as, for example, bicycles, pedestrians, and animals. The multi-static radar detection system 12 includes one or more controllers 20 in electronic communication with one or more receivers 22. The one or more receivers 22 collect multi-carrier modulation signals emitted by one or more transmitters 30. The one or more transmitters 30 are located remotely from the vehicle 10 and are positioned at base stations 32 in the environment 16 surrounding the vehicle 10. Specifically, the base stations 32 are located in fixed geographical locations within the environment 16 surrounding the vehicle 10. It is to be appreciated that the one or more controllers 20 have knowledge of an identity of a specific base station 32 that transmits a specific multi-carrier modulation signal. The one or more transmitters 30 act as the main communication point for one or more wireless mobile client devices. In the example as shown in FIG. 1, a single vehicle 10 including one or more receivers 22 for receiving wireless communication from the transmitters 30 is illustrated. However, it is to be appreciated only a single vehicle is illustrated for purposes of simplicity and clarity, and that more than one vehicle for receiving wireless communication may be located in the environment 16.

Each base station 32 including a transmitter 30 is associated with a cellular identification (cell ID). The cell ID scrambles pilot tones that are transmitted. Upon reception of the combination of the signals at the one or more receivers 22, each receiver 22 detects the cell ID during an initial synchronization procedure. The cell ID assists in separating the signals from a composite signal into signals pertaining to the specific transmitter 30 corresponding to the base station 32.

The multi-carrier modulation signals emitted by the one or more transmitters 30 comply with a wireless data standard, however, it is to be appreciated that non-compliant signals may be used as well. One example of a wireless data standard includes the fifth-generation (5G) technology standard for broadband cellular networks, however, it is to be appreciated that other types of wireless data standards may be used as well. Some examples of multi-carrier modulation signals include, but are not limited to, orthogonal frequency-division multiplexing (OFDM) signals and orthogonal time frequency space (OTFS) signals. The multi-carrier modulation signals include a plurality of subcarriers that each carry reference signals located in predefined, standards-compliant locations therein. The standards-compliant locations are prescribed by any technical standard for wireless data communication for multi-carrier modulation signals such as, for example, the $3^{rd}$ Generation Partnership Project (3GPP) 5G New Radio (NR) standard. The one or more controllers 20 of the vehicle 10 have knowledge of the standards-compliant locations of the reference signals. The multi-carrier modulation signals experience reflection, diffraction, and scattering while propagating throughout the environment 16 surrounding the vehicle 10 and are collected by the one or more receivers 22 of the vehicle 10. It is to be appreciated that the multi-carrier modulation signals collected by the one or more receivers 22 of the vehicle 10 carry spatial information regarding the objects 14 located in the environment 16.

As explained below, the multi-static radar detection system 12 estimates the Doppler shift and the time delay of the one or more objects 14 located in the environment 16 surrounding the vehicle 10 based on the reference signals of the multi-carrier modulation signals collected by the one or more receivers 22. The Doppler shift and the time delay are indicative of a velocity and a range value, respectively, of a corresponding object 14 located in the environment 16 surrounding the vehicle 10. The disclosed multi-static radar detection system 12 employs wireless sensing technologies to estimate the Doppler shift and the time delay of a respective object 14 located in the environment 16, without modifying the wireless data standard that the multi-carrier modulation signals comply with.

Figure 2:
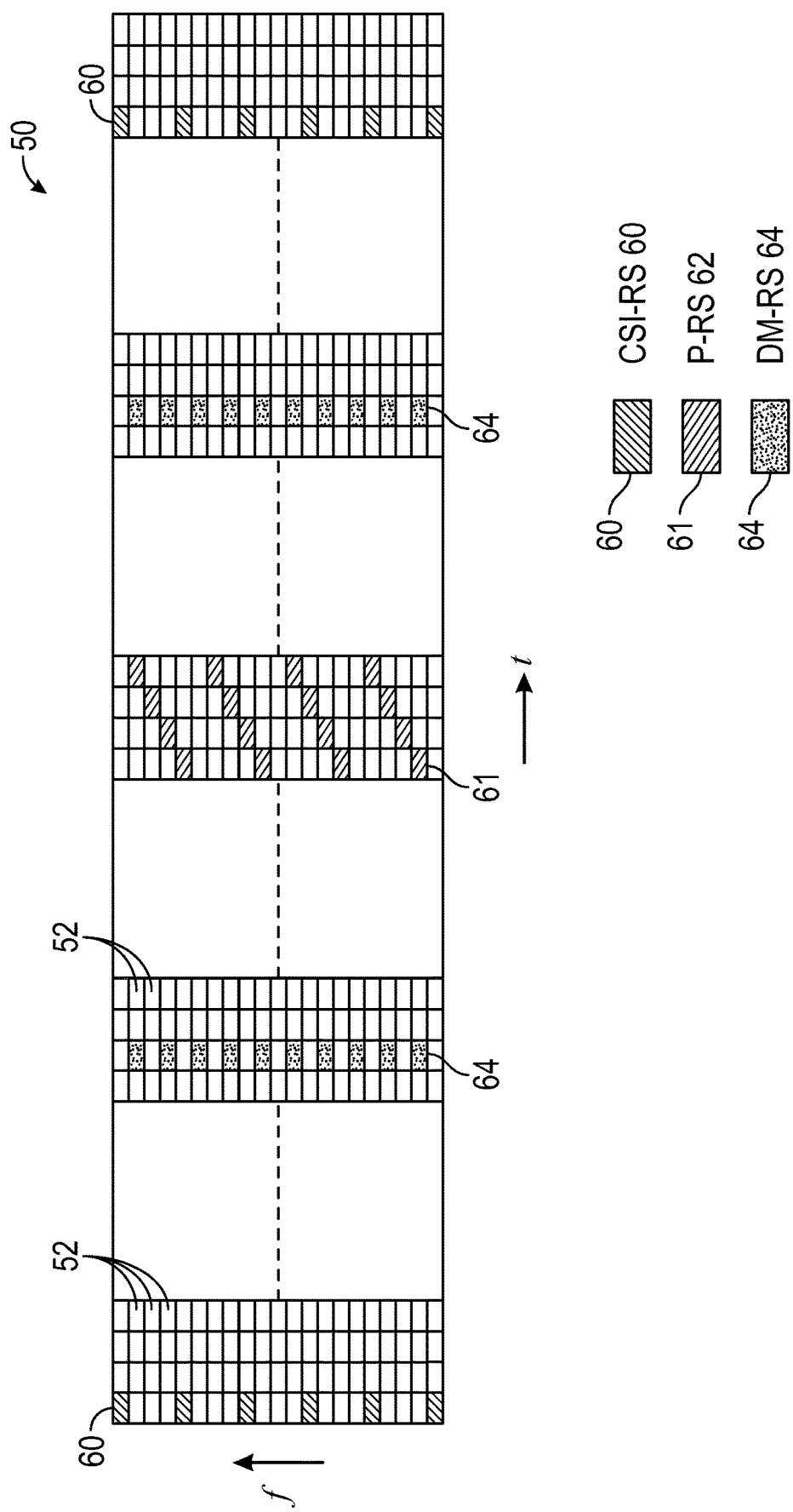
FIG. 2 is an illustration of a time-frequency grid of an exemplary multi-carrier modulation signal received by the one or more receivers of the multi-static radar detection system shown in FIG. 1, according to an exemplary embodiment.

FIG. 2 is an illustration of a time-frequency grid 50 that represents the multi-carrier modulation signal collected by the receiver 22 of the multi-static radar detection system 12. The x-axis of the time-frequency grid 50 represents time t and the y-axis represents frequency. As seen in FIG. 2, the time-frequency grid 50 is divided into a plurality of resource elements 52. The multi-carrier modulation signal includes one or more types of reference signals. In the non-limiting embodiment as shown in FIG. 2, the multi-carrier modulation signal is compliant with the 5G standard and the multi-carrier modulation signal includes a plurality of reference signals types. In particular, the multi-carrier modulation signal includes channel state information reference signals (CSI-RS) 60, positioning reference signals (P-RS) 61, and demodulation reference signals (DM-RS) 64. It is to be appreciated that while the multi-carrier modulation signal may only include one reference signal, two or more different types of reference signals may provide improved or enhanced object detection capabilities. This is because some types of reference signals may not be regularly repeated across time or may not have the bandwidth to meet a certain range resolution. For example, as seen in FIG. 2, the channel state information reference signals 60 are repeated on a regular, periodic basis, however, the positioning reference signals 61 are irregular, and the demodulation reference signals 64 are repeated in short, continuous bursts.

Referring to FIG. 1, the reference signals are transmitted across a fixed bandwidth allocated for the receiver 22, which is referred to as the active bandwidth part (BWP). All communication between the transmitter 30 and the receiver 22 occurs within the BWP. To overcome the effects of limited bandwidth on range resolution, the receiver 22 increases the active BWP by requesting mock or dummy data having an elevated urgency from one of the base stations 32, thus forcing the base station 32 to extend the active BWP to a larger bandwidth. It is to be appreciated that dummy data serves to reserve space where real data is usually present.

FIGS. 3A-3B illustrate a portion of an exemplary time-frequency grid 50 of the multi-carrier modulation signal collected by the receiver 22 of the multi-static radar detection system 12 for a predetermined processing interval. As explained below, the one or more controllers 20 calculate a time-varying frequency response H(t,f) for each resource element 52 that is part of the time-frequency grid 50 containing a corresponding reference signal. The time-varying frequency response H(t,f) is expressed as $$H(t, f) = \frac{Y(t, f)}{X(t, f)}$$

where Y(t,f) represents an output collected by the one or more receivers 22 and X(t,f) represents an input transmitted by the one or more transmitters 30.

The one or more controllers 20 also perform non-uniform interpolation on at least a portion of the unoccupied resource elements 52 of the time-frequency grid 50 to determine a corresponding transfer function 62. An interpolated time-frequency grid 70 includes the time-varying frequency response H(t,f) for each resource element 52 containing the corresponding reference signal and the corresponding transfer function 62 for at least a portion of the unoccupied resource elements 52. Specifically, FIG. 3A illustrates a two-dimensional non-uniform interpolation architecture where the corresponding transfer function 62 is calculated for all of the unoccupied resource elements 52. The one or more controllers 20 then determine a channel response function based on the interpolated time-frequency grid 70 that describes the Doppler shift and time delay of a respective object 14 (FIG. 1). Specifically, in an embodiment, the channel response function is a spreading function $S(\nu,\tau)$, where $\nu$ represents the Doppler shift and $\tau$ represents the time delay. This spreading function $S(\nu,\tau)$ may be expressed as $S(\nu,\tau)=\Sigma_{n=0}^{N_{sc}}\Sigma_{m=0}^{N_{symb}}H(t,f)e^{j2\pi\nu mt}e^{-j2\pi nft}$ where H(t,f) is the transfer function 62 for each resource element 52 that is part of the interpolated time-frequency grid 70 (FIG. 3A), $N_{sc}$ is the number of resource elements in frequency axis, and $N_{symb}$ is the number of resource elements in time axis of the grid 50. The transfer function may be multiplied by a standard two-dimensional windowing functions such as, for example, Bartlett, Bleckmann, Hamming, and Kaiser windows. FIG. 3B illustrates a one-dimensional non-uniform interpolation architecture where the corresponding transfer function 62 is only calculated for unoccupied resource elements 52 that are located at the same time interval as one of the reference signals.

Any two-dimensional discrete band limited signal may be represented using a set of basis functions, which are referred to as Dirichlet kernels. By finding coefficients associated with the set of basis functions, a two-dimensional discrete band limited signal may be determined. In the case of reconstructing the time-varying frequency response H(t,f), a band limit refers to a maximum delay and Doppler values corresponding to the frequency and time domain of a signal, respectively. The one or more controllers 20 enforce the band limits on the time-varying frequency response H(t,f). It is to be appreciated that the band limits specify a range of Doppler and delay values corresponding to the one or more objects 14 for which the time-varying frequency response H(t,f) is reconstructed optimally. This then transforms the problem to solving a system of linear equations in a finite dimensional space to find the coefficients of the set of basis functions. The one or more controllers 20 solve the system of linear equations by computation of a matrix inverse to thereby derive the coefficients. The coefficients can then be used to reconstruct the time-varying frequency response H(t,f) for all of the unoccupied resource elements 52 to determine the interpolated time-frequency grid 70 shown in FIGS. 3A and 3B.

It is to be appreciated that the disclosed two-dimensional nonuniform interpolation technique is computationally intensive. This is because the disclosed two-dimensional nonuniform interpolation technique involves inversion of relatively large matrices to solve for the coefficients for interpolation. Accordingly, in an alternative embodiment, a decomposed one-dimensional non-uniform interpolation approach may be employed instead. The decomposed one-dimensional non-uniform interpolation approach decomposes a two-dimensional problem into two one-dimensional problems in frequency and time domains. Referring to FIG. 3B, the time-frequency grid 50 is first interpolated in the frequency domain to compute a corresponding transfer function 62 for the unoccupied resource elements 52 that are located at the same time interval as one of the reference signals. The one or more controllers 20 then interpolate the interpolated time-frequency grid 70 along the time axis for every subcarrier of the interpolated time-frequency grid 70, where the corresponding transfer function 62 is calculated for all unoccupied time symbols corresponding to a specific subcarrier. This approach is particularly useful when there are sufficient points in both time and frequency domains to allow for 1-D reconstruction in each of those domains.

In another embodiment, the time-frequency grid 50 is first interpolated in the frequency domain to compute a corresponding transfer function 62 for the unoccupied resource elements 52 that are located at the same time interval as one of the reference signals based on a predetermined smooth interpolation function. Some examples of the predetermined smooth interpolation functions include, but are not limited to, a linear or spline smooth interpolation function. The one or more controllers 20 then interpolate the interpolated grid 70 along the time axis for every subcarrier of the interpolated time-frequency grid 70, where the corresponding transfer function 62 is calculated for all unoccupied time symbols corresponding to the specific subcarrier using a linear function.

It is to be appreciated that the time-varying frequency response H(t,f) may be determined, and used as basis for interpolation, for any resource element 52 of the time-frequency grid 50 for which the receiver 22 has knowledge of the multi-carrier modulation signal transmitted by one or more transmitters 30. After demodulation and decoding of payload data symbols, whose correctness is verified by a cyclic redundancy check (CRC) check, and/or consistency of a low-density parity-check (LDPC) code, the symbols at the resource elements 52 allocated for the data symbols for the receiver 22 by the transmitter 30, an input X(t,f) of the transfer function at the specific resource elements 52 are now known and can be used to compute the time-varying frequency response H(t,f) for each resource element 52 containing decoded data symbols In the embodiment as shown in FIG. 3A, the one or more controllers 20 (FIG. 1) first compute the time-varying frequency response H(t,f) for each resource element 52 containing a reference signal of the time-frequency grid 50 based on a transfer function $$\frac{Y(t, f)}{X(t, f)}$$

of the respective reference signal, where Y(t,f) represents an output collected by the one or more receivers 22 (FIG. 1) and X(t,f) represents an input transmitted by the one or more transmitters 30. In the example as shown in FIG. 3A, the time-frequency grid 50 includes two resource elements 52 including the channel state information reference signals 60 and three demodulation reference signals 64. It is to be appreciated that the one or more controllers 20 have knowledge of the reference signals transmitted by the one or more transmitters 30. The one or more controllers 20 perform two-dimensional non-uniform interpolation on each of the unoccupied resource elements 52 of the time-frequency grid 50 to determine a corresponding transfer function 62 for each unoccupied resource element 52 that is part of the time-frequency grid 50. In the embodiment as shown in FIG. 3A, the one or more controllers 20 determine channel estimates for each resource element 52 that is part of the time-frequency grid 50, however, in the example as shown in FIG. 3B channel estimates are only provided for the unoccupied resource elements 52 that are located at the same time interval as one of the reference signals.

Referring to FIGS. 1 and 3A, the one or more controllers 20 then convert the time-varying frequency responses H(t,f) and the transfer function 62 for each resource element 52 that is part of the interpolated time-frequency grid 70 into corresponding Doppler spreading function S(ν,τ) values based on a time-frequency analysis. One example of a time-frequency analysis is a Fourier transform. Therefore, in the embodiment as shown in FIG. 3A, each resource element 52 includes a corresponding Doppler spreading function S(ν,τ) value after performing the Fourier transform upon the interpolated time-frequency grid 70. The one or more controllers 20 then determine an absolute squared value of the Doppler spreading function $|S(\nu,\tau)|^2$, and compares the absolute squared value of the Doppler spreading function $|S(\nu,\tau)|^2$ with a threshold power value for each resource element 52 in the interpolated time-frequency grid 70. The threshold power value is indicative of the multi-carrier modulation signals reflecting off the one or more objects 14 located in the environment 16 surrounding the vehicle 10, and a value of the threshold power value is set based on a predetermined false positive rate. In response to determining the absolute squared value of the Doppler spreading function $|S(\nu,\tau)|^2$ for a specific resource element 52 in the interpolated time-frequency grid 70 is equal to or greater than the threshold power value, the one or more controllers 20 transform the value for the Doppler shift ν into a velocity value and transform the value for the time delay τ into a range value for the corresponding object 14.

It is to be appreciated that Fourier transforms of signals extending over finite time and/or finite bandwidth suffer from the problem of cross correlation sidelobes. This makes it difficult to identify the weak signals from surrounding targets which get buried in the cross correlation of closely located strong powered signals. To alleviate this problem, various standard two-dimensional windowing functions such as, for example, Bartlett, Bleckmann, Hamming, and Kaiser windows may be employed. The two-dimensional time-frequency functions have the property of smoothness in the time-frequency domain, when multiplied with the signals at the resource elements 52 of the interpolated grid 70, the time-varying frequency response H(t,f) reduces the correlation sidelobes in the delay-doppler domain of the spreading function S(ν,τ).

In the embodiment as shown in FIG. 3B, the one or more controllers 20 (FIG. 1) first compute the time-varying frequency response H(t,f) for each resource element 52 containing a reference signal of the time-frequency grid 50. As seen in FIG. 3B, the one or more controllers 20 perform one-dimensional non-uniform interpolation only for the unoccupied resource elements 52 that are located at the same time interval as one of the reference signals to determine a corresponding transfer function 62 for the unoccupied resource elements 52 that are part of the time-frequency grid 50. The interpolated time-frequency grid 70 shown in FIG. 3B includes the time-varying frequency response H(t,f) for each resource element 52 containing the corresponding reference signal and the corresponding transfer function 62 for the unoccupied resource elements 52 located in the same time interval as one of the reference signals.

Figure 4:
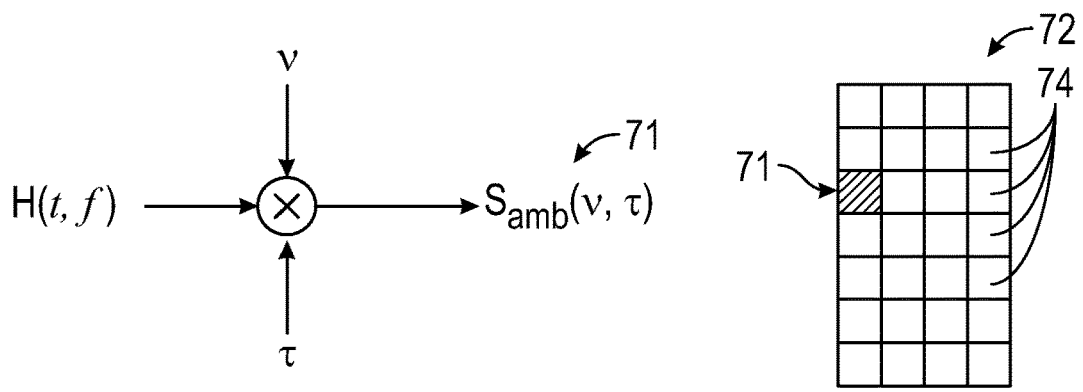
FIG. 4 illustrates cross-correlating a Doppler shift and a time delay with a corresponding time-varying frequency response to determine a correlation sum and a two-dimensional ambiguity grid determined based on the correlation sum, according to an exemplary embodiment.

Referring to FIG. 4, the one or more controllers 20 initialize a two-dimensional ambiguity grid 72 of a range of doppler shifts ν and time delays τ, where each grid element 74 of the two-dimensional ambiguity grid 72 corresponds to a particular Doppler shift ν and time delay τ. Referring to FIGS. 1 and 4, the one or more controllers 20 cross-correlate the time-varying frequency response H(t,f) for each resource element 52 containing the corresponding reference signal and the corresponding transfer function 62 for the unoccupied resource elements 52 of the interpolated time-frequency grid 70 (FIG. 3B) with a corresponding Doppler shift ν and a corresponding time delay τ two-dimensional ambiguity grid 72 to determine a correlation sum 71. The correlation sum 71 is equal to a radar ambiguity function $S_{amb}(\nu,\tau)$. The ambiguity function $S_{amb}(\nu,\tau)$ may be represented by $S_{amb}(\nu,\tau) = \sum_{n=0}^{N_{sc}} \sum_{t_s \in T_s} H(t_s,f) e^{j2\pi\nu m t_s} e^{-j2\pi n f \tau}$ where $H(t_s,f)$ is the transfer function 62 for each resource element 52 that is part of the interpolated time-frequency grid 70 (FIG. 3B) and $T_s$ the set of sampling times of non-uniform samples.

The one or more controllers 20 fill the two-dimensional ambiguity grid 72 based on the correlation sum 71 determined for each resource element 52 containing the corresponding reference signal and the corresponding transfer function 62 for the unoccupied resource elements 52 located in the interpolated time-frequency grid 70 (FIG. 3B). As seen in FIG. 4, the correlation sum 71 determined for a particular Doppler shift ν and time delay τ is stored in a corresponding grid element 74 of the two-dimensional ambiguity grid 72.

It is to be appreciated that while FIGS. 3B and 4 illustrate a one-to-one relationship between the resource elements 52 of the interpolated time-frequency grid 70 and the grid elements 74 of the two-dimensional ambiguity grid 72, the two-dimensional ambiguity grid 72 may be of a different size when compared to the interpolated time-frequency grid 70 as well. Each grid element 74 of the two-dimensional ambiguity grid 72 refers to a given Doppler shift ν and time delay τ that are cross-correlated with the time-varying frequency response H(t,f) of one of the resource elements 52 of the interpolated time-frequency grid 70.

The one or more controllers 20 then select a maximum correlation sum 71 from the two-dimensional ambiguity grid 72, where the maximum correlation sum 71 includes maximum or peak values for the Doppler shift ν and the time delay τ. The peak values of the Doppler shift ν and the time delay τ are indicative of the multi-carrier modulation signals reflecting off the one or more objects 14 located in the environment 16 surrounding the vehicle 10 (FIG. 1). A discussion regarding locating the peak values for the Doppler shift ν and the time delay τ are described below. The one or more controllers 20 then determine a reconstructed time-varying frequency response $H_{recon}(t,f)$ based on the peak values of the Doppler shift ν and the time delay τ for each of the resource elements 52 of the interpolated time-frequency grid 70. The one or more controllers 20 then determine a difference between the reconstructed time-varying frequency response $H_{recon}(t,f)$ and the time-varying frequency responses H(t,f) for each of the resource elements 52 of the interpolated time-frequency grid 70. The difference between the reconstructed time-varying frequency response $H_{recon}(t,f)$ and the time-varying frequency responses H(t,f) for a specific resource element 52 of the interpolated time-frequency grid 70 is compared with the threshold power value. The threshold power value is indicative of the multi-carrier modulation signals reflecting off the one or more objects 14 located in the environment 16 surrounding the vehicle 10 (FIG. 1).

In response to determining the difference between the reconstructed time-varying frequency response $H_{recon}(t,f)$ and the time-varying frequency responses H(t,f) is greater than the threshold power value, the one or more controllers 20 then update the corresponding resource element 52 of the interpolated time-frequency grid 70 with the difference. In other words, the difference between the reconstructed time-varying frequency response $H_{recon}(t,f)$ and the time-varying frequency responses H(t,f) is now the time-varying frequency responses H(t,f) of the corresponding resource element 52 in the interpolated time-frequency grid 70. In an alternative approach, the one or more controllers 20 compare the compare the maximum correlation sum 71 in the two-dimensional ambiguity grid 72 with the threshold power value. In response to the correlation sum 71 being greater than the threshold power value, one or more controllers 20 then update the corresponding resource element 52 of the interpolated time-frequency grid 70 with the difference.

The one or more controllers 20 then re-build the two-dimensional ambiguity grid 72 based on the maximum correlation sum 71. The peak values of the Doppler shift ν and the time delay τ are indicative of the multi-carrier modulation signals reflecting off the one or more objects 14 located in the environment 16 surrounding the vehicle 10 (FIG. 1). The one or more controllers 20 transforms the peak value for the Doppler shift ν of the maximum correlation sum 71 into a velocity value and the peak value of the time delay τ into a range value. The one or more controllers 20 then repeat selecting the maximum correlation sum 71 from the two-dimensional ambiguity grid 72, where the maximum correlation sum 71 represents the peak values for the Doppler shift ν and the time delay τ. The one or more controllers 20 then repeat determining the reconstructed time-varying frequency response $H_{recon}(t,f)$ for each resource element 52 of the interpolated time-frequency grid 70. This is repeated until the difference between the reconstructed time-varying frequency response $H_{recon}(t,f)$ and the time-varying frequency responses H(t,f) is less than the threshold power value. Once the difference between the reconstructed time-varying frequency response $H_{recon}(t,f)$ and the time-varying frequency responses H(t,f) is less than the threshold power value, the one or more controllers 20 terminate the iterative procedure.

Locating the peak values for the Doppler shift ν and the time delay τ shall now be described. It is to be appreciated that locating the correlation maxima may be performed by a simple search on the two-dimensional ambiguity grid 72 and identifying grid elements 74 on the two-dimensional ambiguity grid 72 that have lower values of the ambiguity function. A further refinement of the Doppler shift ν and the time delay τ may be done by a maximum search in the continuous delay-Doppler domain, for example by gradient descent, where the initialization may be performed by the above-mentioned grid search. However, it is to be appreciated that ambiguity functions may experience limited resolution in the delay and Doppler domain, due to the inherent width of the ambiguity function that is determined by the bandwidth and observation period. Furthermore, cross correlation sidelobes, which makes it difficult to identify the weak signals from surrounding targets that get buried in the cross correlation of closely located strong powered signals. Accordingly, to alleviate these issues, the present disclosure employs a serial interference cancellation algorithm as described above.

To localize an object in the surroundings, such as the one or more objects 14 located in the environment 16 surrounding the vehicle 10 (FIG. 1), range and velocity values corresponding to the object 14 from more than one base station 32 transmitters 10 is required. The signals corresponding to different base stations 32 based on the cell IDs. In addition to aiding in localization, receiving from multiple base stations 32 has another advantage. The delays and dopplers corresponding to the objects 14 which are located between the base station 32 and the receiver 22 are clustered very close to each other and are nearly zero. As a result, the performance of the algorithms for extracting the objects accurately may be limited. To alleviate these issues, the multi-carrier modulation system 12 continues to receive reference signals from multiple base stations 32 (including the ones which have previously passed) so that each of the surrounding objects are not in between the base station 32 and an observer for at least one of the multiple base stations 32.

Figure 5:
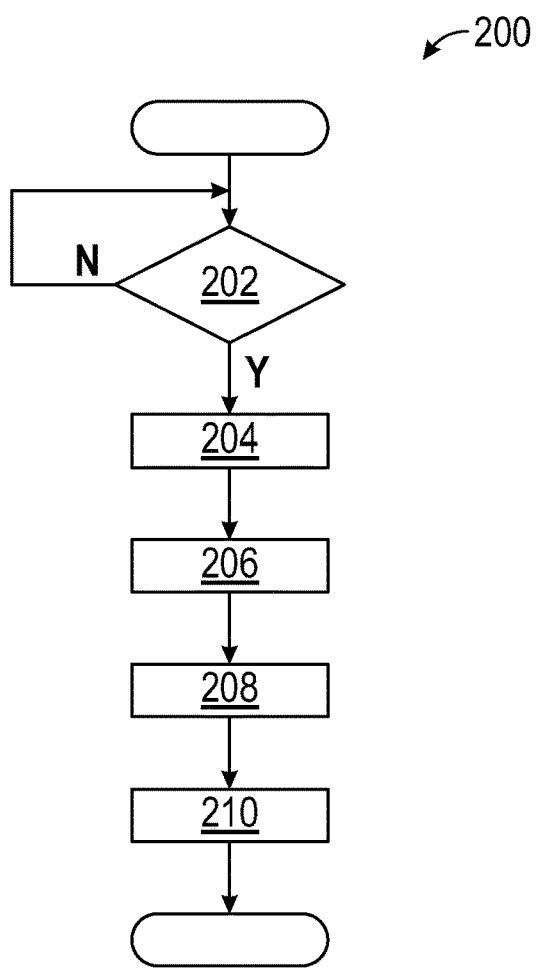
FIG. 5 is a process flow diagram illustrating a method for estimating a Doppler shift and the time delay of one or more objects located in an environment surrounding the vehicle by the disclosed multi-static radar detection system, according to an exemplary embodiment.

FIG. 5 is an exemplary process flow diagram illustrating a method 200 for estimating the Doppler shift ν and the time delay τ of one or more objects 14 located in the environment 16 (FIG. 1) surrounding the vehicle 10 by the disclosed multi-static radar detection system 12. Referring generally to FIGS. 1-5, the method 200 may begin at block 202. In block 202, the one or more controllers 20 continue to monitor the one or more receivers 22 until a multi-carrier modulation signal emitted by one or more transmitters 30 is collected by the one or more receivers 22. The method 200 may then proceed to block 204.

In block 204, the one or more controllers 20 calculate the time-varying frequency response H(t,f) for each resource element 52 that is part of the time-frequency grid 50 (seen in FIGS. 3A and 3B) that contains a corresponding reference signal based on a time-frequency analysis, such as a Fourier transform. The method 200 may then proceed to block 206.

In block 206, the one or more controllers 20 perform non-uniform interpolation on at least a portion of unoccupied resource elements 52 that are part of the time-frequency grid 50 to determine the corresponding transfer function 62. Specifically, as mentioned above, FIG. 3A illustrates the two-dimensional non-uniform interpolation architecture where the corresponding transfer function 62 is calculated for all of the unoccupied resource elements 52, and FIG. 3B illustrates a one-dimensional non-uniform interpolation architecture where the corresponding transfer function 62 is only calculated for unoccupied resource elements 52 that are located at the same time interval as one of the reference signals. The method 200 may then proceed to block 208.

In block 208, the one or more controllers 20 determine the Doppler shift ν and the time delay τ of a respective object 14 located within the environment 16 surrounding the vehicle 10 (FIG. 1). In the embodiment as shown in FIG. 3A, the one or more controllers 20 execute a time-frequency analysis, such as a Fourier transform, to convert the time-varying frequency responses H(t,f) and the transfer function 62 for each resource element 52 that is part of the interpolated time-frequency grid 70 into corresponding Doppler spreading function S(v,τ). In the embodiment as shown in FIGS. 3B and 4, the one or more controllers 20 build a two-dimensional ambiguity grid 72 based on the correlation sum 71, and select the maximum correlation sum 71 from the two-dimensional ambiguity grid 72, where the maximum correlation sum 71 includes maximum or peak values for the Doppler shift v and the time delay τ. The one or more controllers 20 execute the serial interference cancellation algorithm by recursively building the two-dimensional ambiguity function grid 72 and computing the maximum correlation sum 71, which includes maximum or peak values for the Doppler shift v and the time delay τ. The method 200 may then proceed to block 210.

In block 210, the one or more controllers 20 transform the value for the Doppler shift v into a velocity value for the corresponding object 14 and the value for the time delay τ into a range value for the corresponding object 14. The method 200 may then terminate.

Referring generally to the figures, the disclosed multi-static radar detection system provides various technical effects and benefits. Specifically, the disclosure provides an approach for estimating the Doppler shift and time delay of objects located in the environment with improved accuracy. Moreover, the disclosed multi-static radar detection system may detect objects in the environment that would otherwise be difficult, if not impossible, to detect using conventional monostatic radar detection systems because of limited range and field-of-view that monostatic systems provide. In particular, the multi-static radar detection system utilizes transmitters positioned at base stations that are remotely located from the vehicle, which in turn obviates the limited field-of-view issues. It is to be appreciated that the multi-static radar detection system utilizes existing wireless infrastructure and does not require modification of wireless data standards to perform wireless sensing. The disclosed approach may also combine reference signals when calculating the Doppler shift and time delay, where combining the reference signals improves wireless sensing capabilities.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A multi-static radar detection system for a vehicle, the multi-static radar detection system comprising:
one or more receivers for collecting multi-carrier modulation signals emitted by one or more transmitters that are positioned at base stations located in an environment surrounding the vehicle, wherein the multi-carrier modulation signals include one or more types of reference signals; and
one or more controllers in electronic communication with the one or more receivers, wherein the one or more controllers execute instructions to:
collect, by the one or more receivers, a multi-carrier modulation signal emitted by the one or more transmitters, wherein a time-frequency grid representing the multi-carrier modulation signal is divided into a plurality of resource elements;
calculate a time-varying frequency response for each resource element that is part of the time-frequency grid that contains a corresponding reference signal based on a time-frequency analysis;
perform non-uniform interpolation on at least a portion of unoccupied resource elements that are part of the time-frequency grid to determine a corresponding transfer function, wherein an interpolated time-frequency grid includes the time-varying frequency response and the corresponding transfer function for the unoccupied resource elements, wherein performing non-uniform interpolation on at least the portion of unoccupied resource elements that are part of the time-frequency grid comprises:
performing one-dimensional non-uniform interpolation only for unoccupied resource elements located at the same time interval as a reference signal to determine the corresponding transfer function for the unoccupied resource elements that are part of the time-frequency grid;
determine a Doppler shift and a time delay of a respective object located within the environment surrounding the vehicle based on the interpolated time-frequency grid;
transform a value for the Doppler shift into a velocity value and a value for the time delay into a range value;
cross-correlate the time-varying frequency response for each resource element containing the corresponding reference signal and the corresponding transfer function for the unoccupied resource elements of the interpolated time-frequency grid with a corresponding Doppler shift and a corresponding time delay to determine a correlation sum; and
fill a two-dimensional ambiguity grid with the correlation sum determined for each grid element of the two-dimensional ambiguity grid.

2. The multi-static radar detection system of claim 1, wherein the one or more controllers determine a channel response function that includes the Doppler shift and the time delay of the respective object.

3. The multi-static radar detection system of claim 1, wherein performing non-uniform interpolation on at least the portion of unoccupied resource elements that are part of the time-frequency grid comprises:
performing two-dimensional non-uniform interpolation for each unoccupied resource element of the time-frequency grid to determine the corresponding transfer function for each unoccupied resource element that is part of the time-frequency grid.

4. The multi-static radar detection system of claim 3, wherein the one or more controllers execute instructions to:
convert the time-varying frequency response and the corresponding transfer function for each resource element that is part of the interpolated time-frequency grid into corresponding Doppler spreading function values; and compare an absolute squared value of each of the corresponding Doppler spreading function values with a threshold power value for each resource element of the interpolated time-frequency grid.

5. The multi-static radar detection system of claim 4, wherein the one or more controllers execute instructions to:

in response to determining the absolute squared value for a Doppler spreading function values shift corresponding to a specific resource element in the interpolated time-frequency grid is equal to or greater than the threshold power value, transform the value for the Doppler shift into a velocity value and transform the value for the time delay into a range value.

6. The multi-static radar detection system of claim 4, wherein the threshold power value is indicative of the multi-carrier modulation signals reflecting off the respective object located in the environment surrounding the vehicle.

7. The multi-static radar detection system of claim 1, wherein the one or more controllers execute instructions to:

select a maximum correlation sum from the two-dimensional ambiguity grid, wherein the maximum correlation sum includes a peak value for the Doppler shift and a peak value for the time delay;

determine a reconstructed time-varying frequency response based on the peak value of the Doppler shift and the peak value of the time delay for each grid element corresponding to a reference signal of the interpolated time-frequency grid;

determine a difference between the reconstructed time-varying frequency response and the time-varying frequency response for a specific resource element of the interpolated time-frequency grid; and compare the difference with a threshold power value.

8. The multi-static radar detection system of claim 7, wherein the one or more controllers execute instructions to:

In response to determining the difference between the reconstructed time-varying frequency response and the time-varying frequency responses is greater than the threshold power value, update the corresponding resource element of the interpolated time-frequency grid with the difference; and repeat selecting the maximum correlation sum from the two-dimensional ambiguity grid until the difference between the reconstructed time-varying frequency response and the time-varying frequency responses is less than the threshold power value.

9. The multi-static radar detection system of claim 1, wherein the multi-carrier modulation signals include two or more types of reference signals.

10. The multi-static radar detection system of claim 9, wherein the two or more types of reference signals include channel state information reference signals (CSI-RS), positioning reference signals (P-RS), and demodulation reference signals (DM-RS).

11. The multi-static radar detection system of claim 1, wherein the multi-carrier modulation signals are compliant with a wireless data standard.

12. The multi-static radar detection system of claim 1, wherein a receiver increases an active bandwidth part (BWP) by requesting dummy data having an elevated urgency from one of the base stations.

13. The multi-static radar detection system of claim 1, wherein the time-varying frequency response is used as basis for interpolation for any resource element of the time-frequency grid for which the one or more receivers have knowledge of the multi-carrier modulation signal transmitted by one or more transmitters.

14. A vehicle, comprising:

a multi-static radar detection system, comprising:

one or more receivers collecting multi-carrier modulation signals emitted by one or more transmitters that are positioned at base stations located in an environment surrounding the vehicle, wherein the multi-carrier modulation signals include one or more types of reference signals; and one or more controllers in electronic communication with the one or more receivers, wherein the one or more controllers execute instructions to:

collect, by the one or more receivers, a multi-carrier modulation signal emitted by the one or more transmitters, wherein a time-frequency grid representing the multi-carrier modulation signal is divided into a plurality of resource elements;

calculate a time-varying frequency response for each resource element that is part of the time-frequency grid that contains a corresponding reference signal based on a time-frequency analysis;

perform non-uniform interpolation on at least a portion of unoccupied resource elements that are part of the time-frequency grid to determine a corresponding transfer function, wherein an interpolated time-frequency grid includes the time-varying frequency response and the corresponding transfer function for the unoccupied resource elements, wherein performing non-uniform interpolation on at least the portion of unoccupied resource elements that are part of the time-frequency grid comprises:

performing one-dimensional non-uniform interpolation only for unoccupied resource elements located at the same time interval as a reference signal to determine the corresponding transfer function for the unoccupied resource elements that are part of the time-frequency grid;

determine a Doppler shift and a time delay of a respective object located within the environment surrounding the vehicle based on the interpolated time-frequency grid;

transform a value for the Doppler shift into a velocity value and a value for the time delay into a range value;

cross-correlate the time-varying frequency response for each resource element containing the corresponding reference signal and the corresponding transfer function for the unoccupied resource elements of the interpolated time-frequency grid with a corresponding Doppler shift and a corresponding time delay to determine a correlation sum; and fill a two-dimensional ambiguity grid with the correlation sum determined for each grid element of the two-dimensional ambiguity grid.

15. The vehicle of claim 14, wherein the one or more controllers determine a channel response function that includes the Doppler shift and the time delay of the respective object.

16. The vehicle of claim 14, wherein the multi-carrier modulation signal includes two or more types of reference signals.

17. The vehicle of claim 14, wherein the multi-carrier modulation signal is compliant with a wireless data standard.

18. A method for estimating a Doppler shift and a time delay of one or more objects located in an environment surrounding a vehicle by a multi-static radar detection system, the method comprising:

collecting, by one or more receivers, a multi-carrier modulation signal emitted by one or more transmitters, wherein a time-frequency grid representing the multi-carrier modulation signal is divided into a plurality of resource elements, wherein the one or more receivers are positioned at base stations located in the environment surrounding the vehicle, and wherein the multi-carrier modulation signals include one or more types of reference signals;

calculating a time-varying frequency response for each resource element that is part of the time-frequency grid that contains a corresponding reference signal based on a time-frequency analysis;

performing non-uniform interpolation on at least a portion of unoccupied resource elements that are part of the time-frequency grid to determine a corresponding transfer function, wherein an interpolated time-frequency grid includes the time-varying frequency response and the corresponding transfer function for the unoccupied resource elements, wherein performing non-uniform interpolation on at least the portion of unoccupied resource elements that are part of the time-frequency grid comprises:

performing one-dimensional non-uniform interpolation only for unoccupied resource elements located at the same time interval as a reference signal to determine the corresponding transfer function for the unoccupied resource elements that are part of the time-frequency grid;

determining a Doppler shift and a time delay of a respective object located within the environment surrounding the vehicle based on the interpolated time-frequency grid;

transforming a value for the Doppler shift into a velocity value and a value for the time delay into a range value;

cross-correlating the time-varying frequency response for each resource element containing the corresponding reference signal and the corresponding transfer function for the unoccupied resource elements of the interpolated time-frequency grid with a corresponding Doppler shift and a corresponding time delay to determine a correlation sum;

filling a two-dimensional ambiguity grid with the correlation sum determined for each grid element of the two-dimensional ambiguity grid; and determining a channel response function based on the interpolated time-frequency grid, wherein the channel response function describes a Doppler shift and a time delay of a respective object located within the environment surrounding the vehicle.

* * * * *